United States Patent Office 2,803,543
Patented Aug. 20, 1957

2,803,543

COLOR CORRECTION PROCESS

Jacob Quentin Umberger, Holmdel, N. J., assignor to E. I. du Pont de Nemours and Company, Wilmington, Del., a corporation of Delaware No Drawing. Application February 29, 1952, Serial No. 274,287

5 Claims. (Cl. 96—8)

This invention relates to a photographic masking process. More particularly it relates to color photography. Still more particularly it relates to a color correction process for obtaining accurate multi-color reproduction. Still more particularly it relates to such a process wherein the masking results from processing two or more latent image-bearing emulsion layers coated on one side of a support under conditions which favor interaction between at least two of such layers during development of said latent images to silver.

An object of this invention is to provide improvements in the art of color photography. A more specific object is to provide a simple and effective process for accurately reproducing a multicolor scene which is recorded in a multilayer photographic element whereby automatic color correction is obtained which compensates for undesirable spectral absorptions of the colorants usually used in subtractive color photography. Another specific object is to provide a process for obtaining negative or minus sensitivity in certain spectral regions of the camera or "taking" film emulsion layers as specified by the tristimulus theory of color reproduction whether additive or subtractive. Still other objects will be apparent from the following description of the invention.

Prior masking processes involve the use of special colored color-formers (see J. of the Optical Soc. of America, March 1950, p. 166, W. T. Hanson, Jr.) or the preparation of special masks on separate film supports. For example, to correct for the unwanted blue light absorption of magenta colorants, it has been customary in the art to make a separate positive from the green record color separation negative and bind said positive in contact with the blue record separation negative when photographically printing the latter with the yellow colorant.

By this invention the above result is accomplished without colored color-formers by allowing the blue and green color separation negative layers to develop in contact with each other in such a way as to effectively place a mask from the outer green record negative over the inner blue record negative. In other words, by interlayer effect a positive image from the green record is automatically superimposed on the blue record negative.

The prior art methods possess several disadvantages. Colored color-formers limit the photographic speed and layer arrangements possible in monopack multilayer color films and furthermore cannot be used in final release prints. Non-integral masking systems introduce extra operations and registration problems, because the primary image and masking image are on separated film supports as mentioned above.

Previous to this invention, all masking methods superimposed extra optical density on the film from which a print is to be made. This slows up the printing operation considerably (up to 100 or more times) due to the reduction in printing light by extra density added by the mask. The present invention overcomes this disadvantage which is important, particularly when printing into a low speed color positive print film. Furthermore, the method of color correction of this invention can be employed in the final color print and thus produce more faithful color reproduction.

In practicing this invention the interlayer effects from the development of exposed multilayer photographic elements are utilized in color correction. Prior to the present invention the interlayer development effects in multilayer films were considered as having serious disadvantages. Such interlayer effects were assiduously avoided by use of special developers such as "depth developers." Previous to this invention such "depth developers" were considered indispensible for developing negative images in multilayer monopacks, "where several layers have to be developed simultaneously and at equal rates" (Friedman, History of Color Photography, p. 112, Am. Phot. Pub. Co., 1944).

Thus, Troland U. S. Reissue Patent 18,680 of December 6, 1932, states (page 4, lines 65 to 70) that "This has the effect of producing a local reduction of development of the green record image underneath relatively high densities of the red record image, with a correspondingly bad effect upon the final color rendering." Troland proposed to eliminate interlayer development effects and states (page 4, lines 70–80), "In order to reduce this so-called exhaustion effect to a minimum it is desirable to use a developer possessing a high diffusion tendency and a relatively low reduction potential. Such a developer is hydroquinone combined with an alkaline carbonate (e g., in the ratio of one part hydroquinone to ten parts of carbonate in one hundred parts of water). A small amount of metol may also be added to render the development more rapid." In this developer solution the hydroquinone is highly ionized thus producing a marked induction period (see James & Higgins, Fundamentals of Photographic Theory, Wiley 1948, pages 108–110).

The fact that interlayer effects are still considered to be a serious problem to contemporary workers in the art is evinced by the recent Capstaff article in the Journal of the Society of Motion Picture and Television Engineers, April 1950, pages 445 et seq. On pages 449 and 450 there appear the following statements: "When working out a motion picture film, it was considered important to succeed in stripping prior to development in order to avoid defects arising from depth development. As is well known to those working with material coated in several layers, these defects can be quite serious. . . . Another advantage in stripping before processing is that a certain measure of gamma control is possible by regulating the amount of development in the usual way."

Jennings U. S. Patent 2,462,503 describes the development of the two-layer film of a bipack before stripping. In order to obtain adequate gamma in the innermost layer, the latent images in all layers are developed to completion by use of a powerful developer such as disclosed in col. 5, lines 25–30 of the Jennings patent. In the present invention incomplete development is effected in order to obtain a masking effect. Also, the element of 2,462,503 is designed to permit attainment during development of equal silver gamma in outer and inner layers by use of relatively low coating weight for the outer emulsion layer. We have discovered that this eliminates the advantageous interlayer development masking effect especially when the developer disclosed by Jennings is employed. Jennings cannot achieve the independent control over the development gamma of inner and outer layers desired by Capstaff. Furthermore, to obtain the high quality of color reproduction desired, some method of color correction is necessary particularly when copying a color reproduction instead of the original. This is evinced by the extensive patented art in the field of color coupling where colored color couplers are used in negative or intermediate film materials to achieve better color rendition in the final color print.

It has now been discovered that automatic masking and simplified gamma control can be obtained by use of interlayer development effects and subsequent intensification to the desired gamma of the under-developed layer nearest the base. The intensification step preferably is performed after the removal of the outer image-bearing layer or layers.

The above objects are attained by the present invention that relates to an automatic masking process which comprises developing an exposed multilayer film having two or more color component latent silver image-bearing layers on the same side of the support to such an extent that the silver images in the innermost layer have a gamma not more than $.80\gamma_n$ where $\gamma_n$ would be the gamma of said innermost developed layer if there had been no exposure in any of the outer layers. The silver images of the outer layers are simultaneously developed to $\gamma_o$, where $\gamma_o$ is the gamma desired for the outer layer or layers. The element is then fixed, washed and dried. The outer image-bearing layer or layers can subsequently be removed, e. g., by transfer to a new support, stripping and discarding (after photographic copying) or by dissolving and washing from the original film. The silver color-component image of the inner image-bearing layer is then intensified. A said outer image-bearing layer is photographically printed to form a subtractive colorant image which has unwanted light absorption in the spectral region of preponderant light absorption of another subtractive colorant image which is likewise formed by printing from said intensified innermost image-bearing layer the two images being superposed on one support. In this manner correction for the unwanted light absorption of the first mentioned colorant is obtained.

Development of the multilayer film element can be accomplished advantageously by means of a slow-acting black-and-white developer, e. g., a fine grain motion picture negative developer for continuous developing. Such a developer while used for simple black-and-white negative films has not been proposed for developing multilayer color films. Being a slow-acting developer, the latent image of the innermost layer is only partially developed, and as a consequence substantial interlayer development effects are obtained in a multilayer film. However, these effects have been assiduously avoided in prior procedures. Preferred developers for this invention are the antithesis of so-called "depth" developers, i. e., they do not contain ingredients such as restrainers, etc., in amounts which retard development relatively more in the outer layers than in the innermost layer. See Friedman U. S. P. 2,541,865, col. 3, lines 46–75.

The intensification of the inner underdeveloped color-component silver image record can be accomplished advantageously by bleaching the silver images to silver salt images, e. g., by means of a ferricyanide ion bleach bath which also contains ferric, uranyl, lead, or other ions. Alternatively the low gamma silver image may be converted to an insoluble salt and then redeveloped in a color-coupling developer to form a dye image rather than a toned image. Further intensification of the innermost low gamma layer can be accomplished during simultaneous development of the inner and outer layers of the multilayer film by incorporating the chemical compounds needed for intensification into the emulsion before coating, e. g., non-diffusing color formers which form quinoneimine or azomethine dyes. Fine grain dispersions of insoluble ferric salts, lead salts, etc., may also be incorporated in the emulsion layer so that toning intensification can occur during bleaching in a conventional ferricyanide solution. The intensification may be subproportional, proportional or superproportional but in no case should the gamma of the final intensified image of the innermost layer be less than 0.5, nor greater than 3.0 and preferably not greater than 1.0.

Interlayer development effects can be exaggerated by various means. Thus limited agitation; emulsion layers of limited permeability; emulsion binders or layers of limited buffering or accepting capacity for bromide, iodide or hydrogen ions; developer solutions low in hydrogen, bromide or iodide ion buffering capacity; developing agents like chlorohydroquinone with a high coefficient of dilution, like hydroquinone and p-phenylene-diamine types which are easily repressed in their developing action by bromide or iodide ions, like pyrogallol and hydroquinone which are easily repressed in their developing action by addition of acid, like monomethyl p-aminophenol whose oxidized form inhibits further development; and low concentration of developing agent, alone or in combination, contribute to exaggerated interlayer development effects.

The invention will be further illustrated by but is not limited to the following examples.

*Example 1*

A perforated photographic motion picture stripping film of the type described in Jennings U. S. Patent 2,462,503 in colum 6, lines 64 to 66, in which a gelatino-silver iodobromide photosensitive emulsion was used to produce a silver halide coating weight of 35 mg. per square dec. for the green-blind red sensitive layer which contained 1,1'-diethyl-2,4-carbocyanine iodide, said layer being nearest the film support and a silver halide coating weight of 75 mg. per square dec. for the outer orthochromatic gelatin-silver halide emulsion layer containing 1,1'-diethyl-2,2'-cyanine iodide as the green light sensitizing dye and the yellow filter dye shown in Example 2 of Gaspar U. S. Patent 2,274,782 as a yellow filter dye which was coated on an intermediate sodium-o-sulfobenzaldehyde polyvinyl acetal stripping layer was placed in a camera in emulsion to emulsion contact with a blue-record front film as disclosed in said U. S. Patent 2,462,503 and exposed to a multicolor scene the entrant light first passing through the blue-record film. The blue-record front film comprised a cellulose acetate film base and a blue-sensitive gelatino silver iodobromide emulsion layer. The films were removed from the camera and the front film was developed to gamma 0.8 for about 10 minutes at 68° F. with normal agitation in a negative developer having a pH about 8.9 at 68° F. and made by admixing the following components:

| | |
|---|---:|
| Water _____cc__ | 975.0 |
| Monomethyl p-aminophenol, sulfuric acid salt grams__ | 0.8 |
| Sodium sulfite, anhydrous _____do____ | 90.0 |
| Hydroquinone _____do____ | 1.0 |
| Borax _____do____ | 3.0 |
| Potassium bromide _____do____ | 0.1 |
| Final volume, 1.0 liter. | |

The rear multilayer film was processed as follows: (a) developed for 14 minutes at 68° F. with normal agitation in a negative developer of the same type as the front film whereby the outer layer was developed to gamma 0.8 and the inner to gamma 0.31, (b) fixed for a period of 14 minutes in a hardening fixer made by admixing the following components:

| | |
|---|---:|
| Water _____cc__ | 500.0 |
| Hypo _____grams__ | 300.0 |
| Sodium sulfite, anhydrous _____do____ | 11.0 |
| Potassium alum _____do____ | 10.0 |
| Acetic acid, 28% _____cc__ | 45.0 |
| Water to make up to 1.0 liter. | |

(c) the fixed film was washed for a period of five minutes in cold running water and dried. Then the rear film was soaked for 30 seconds in the following emulsion-transfer solution at 78° F.:

| | | |
|---|---|---|
| Water | cc | 750.0 |
| Sodium tetralin sulfonate | grams | 62.5 |
| Sodium dodecyl sulfate | do | 31.3 |
| Oxalic acid, dihydrate | do | 20.0 |

Water to make 1.0 liter.

and the wet outer emulsion layer was then pressed into intimate contact with a second similarly perforated gelatin blank film comprising a transparent cellulose acetate film base coated with a gelatin layer to a weight of about 75 mg. per square dec. The outer layer was then stripped from the remaining red-record and the blank film with its adherent image record was washed and dried. The red-record silver image remaining on the original rear film base was intensified to gamma 0.8 by first bleaching it in an aqueous potassium ferricyanide solution containing potassium bromide and then developing it to such a gamma in a color developing solution containing p-aminodiethyl aniline hydrochloride, m-(3-methylsalicylamido)benzaldehyde ethylene glycol acetal (described in Martin U. S. Patent 2,518,704), sodium carbonate, potassium bromide and a small amount of sodium sulfite. A cyan colored dye image was formed in situ with the developed silver image. The gamma was 0.8 to the red light used to print this color component negative into the print film below.

The 3 separate film elements containing the color-separation silver image records were then separately printed into the appropriate layers of a multilayer color print film of the type described in the Journal of the Society of Motion Picture and Television Engineers, November 1950, pages 455–476. This multilayer film was composed of a cellulose acetate base having a removable antihalation backing on one side and differently sensitized yellow, cyan and magenta color-forming polyvinyl acetal polymer-silver halide emulsion layers coated in that order on the other side of the base. A yellow filter material (e. g., tartrazine C. I. No. 640) was present in the magenta color former emulsion layer. The exposed multilayer color film was then color-developed at 68° F. in a solution made by admixing the following components:

| | Grams |
|---|---|
| p-Aminodiethylaniline hydrochloride | 2.5 |
| Sodium sulfite (anhydrous) | 10.0 |
| Sodium carbonate, monohydrate | 47.0 |
| Potassium bromide | 2.0 |

Water to make 1.0 liter.

for 10 minutes and processed to a color print as described on pp. 469–471 of the above reference.

The resulting color print had brighter reds and more saturated blue-green dye images than normal for prints made from direct separation negatives not masked by interlayer development effect. The masked red record negative image produced by being under-developed in contact with the green-record negative image corrected for the red light density of the magenta dye color-developed in the above color print film.

*Example II*

The front and rear film bipack elements of the type described in Jennings U. S. Patent 2,462,503, Example 1, were exposed while in emulsion-to-emulsion contact to a multicolor scene. However, the yellow filter dye of Example 2 of Gaspar U. S. Patent 2,274,782 was used instead of colloidal silver in the blue record emulsion and the coating weights of silver halide were slightly different from Jennings' example, viz., blue record 35 mg. per square dec., green record 85 mg. per square dec., and red record 87 mg. per square dec. The red-record negative was developed 9 minutes at 68° F. to gamma 0.8 in developer prepared as follows:

| | | |
|---|---|---|
| Water | cc | 750.0 |
| Monomethyl p-aminophenol, sulfuric acid salt | grams | 1.0 |
| Hydroquinone | do | 2.0 |
| Sodium sulfite, anhydrous | do | 50.0 |
| Borax | do | 7.5 |
| Potassium bromide | do | 0.2 |

The front film was developed in the same developer (pH 8.8±.1) for 14 minutes at 68° F., fixed in a hardening fixer mixed as follows:

| | | |
|---|---|---|
| Water | cc | 500.0 |
| Hypo | grams | 300.0 |
| Sodium sulfite, anhydrous | do | 11.0 |
| Potassium alum | do | 10.0 |
| Acetic acid, 28% | cc | 45.0 |

Water to make up to 1.0 liter.

for 14 minutes at 68° F., washed 14 minutes, and dried. Acetic acid was used during the making of the fixer to adjust pH to 4.0. Then the front film was soaked for 30 seconds in the following emulsion-transfer solution at 78° F.:

| | | |
|---|---|---|
| Water | cc | 750.0 |
| Sodium tetralin sulfonate | grams | 62.5 |
| Sodium dodecyl sulfate | do | 31.3 |
| Oxalic acid, dihydrate | do | 20.0 |

Water to make 1.0 liter.

and the wet outer emulsion layer rolled in contact with the dry gelatin surface of a cellulose acetate film base previously coated with a solution of gelatin and chrome alum at pH 6.2 to a coating weight of 75 mg. gelatin and 1 mg. chrome alum per square dec. After a contact time of 10 seconds the film supports were stripped apart with the green record emulsion layer adhering to the new film base and the blue record emulsion layer adhering to the original film base. The gamma of the green record image was 0.8 and the blue record gamma was 0.2. This low gamma blue record film was treated in an iron toner, mixed as below:

| | | |
|---|---|---|
| Water | cc | 750.0 |
| Ferric ammonium citrate | grams | 3.0 |
| Potassium oxalate | do | 6.0 |
| Potassium ferricyanide | do | 2.25 |
| Hydrochloric acid, concentrated | cc | 8.0 |

Water to make 1.0 liter.

for seven minutes at 77° F. and its gamma thereupon increased to 0.8 to green printing light. Having now dried the three separation negatives of 0.8 gamma, they were then exposed into the appropriate layers of the color print film of Example I. This color print film was then processed to a color reproduction of the original scene by development in p-aminodiethylaniline color developer as in Example I. This multicolor print exhibited brighter blues and more saturated yellows than normal for prints made from direct separation negatives not masked by interlayer development effect. The masked blue record negative image produced by being under-developed in contact with the green record negative image corrected for the blue light density of the magenta dye which formed in said color print film by the color development.

*Example III*

A front film element identical with the front film of Example II except that the silver halide coating weight of the inner blue record emulsion layer was reduced from 35 to 14 mg. of silver halide per square dec. This element was exposed normally and developed as in Example II to gamma 0.8 in the outer or green record emulsion layer. After the green record emulsion had been stripped off and the very weak blue record image had been toned as in Example II to gamma about 0.8 to red light, it was found that the interlayer development effect of the green record had been so great as to cause reversal of the densities in the "toe" region of the blue record negative.

Example IV

The element of Jennings U. S. Patent 2,462,503, page 6, lines 64 to 66, in which gelatino-silver iodobromide photosensitive emulsion was used to produce a silver halide coating weight of 35 mg. per square dec. for the green-blind red sensitive (1,1'-diethyl-2,4-carbocyanine iodide as dye sensitizer) layer nearest the film support and a silver halide coating weight of 75 mg. per square dec. for the outer orthochromatic gelatino silver halide emulsion layer containing 1,1'-diethyl-2,2'-cyanine iodide as the green-light sensitizing dye which was coated on top of the intermediate polyvinyl alcohol sodium-o-sulfobenzaldehyde acetal stripping layer. The yellow filter dye of Example 2 of Gaspar U. S. Patent 2,274,782 was added to the outer or orthochromatic layer. This film was exposed to incandescent light with and without a sharp-cutting filter transmitting essentially all light of wavelength greater than 590 millimicrons (e. g., a Wratten No. 25 red filter). The film was then developed 14 min. at 68° F. with normal agitation in a negative developer having a pH about 8.9 at 68° F. of the composition:

| | |
|---|---:|
| Water _____ cc__ | 975.0 |
| Monomethyl p-aminophenol, sulfuric acid salt grams__ | 0.8 |
| Sodium sulfite, anhydrous _____ do__ | 90.0 |
| Hydroquinone _____ do__ | 1.0 |
| Borax _____ do__ | 3.0 |
| Potassium bromide _____ do__ | 0.1 |
| Final volume, 1.0 liter. | | and fixed 14 minutes in hardening fixer mixed as follows:

| | |
|---|---:|
| Water _____ cc__ | 500.0 |
| Hypo _____ grams__ | 300.0 |
| Sodium sulfite, anhydrous _____ do__ | 11.0 |
| Potassium alum _____ do__ | 10.0 |
| Acetic acid, 28% _____ cc__ | 45.0 |
| Water to make up to 1.0 liter. | |

Acetic acid was used during the making of this fixer to adjust pH to 4.0. The fixed film was washed 5 minutes in cold running water and dried without delay. When the outer emulsion was stripped off (by soaking in 5% aqueous citric acid), it was found that the gamma of the red record emulsion was 0.46 where the red filter had prevented green light from recording in the outer layer and 0.31 where the green record had been exposed and developed to a gamma of 0.8. The interaction between these two layers during development reduced the gamma of the red record emulsion layer from 0.46 to 0.31 or 33%. In this example $\gamma_n=0.46$ and $\gamma_o=0.8$. The gamma of the outer or green record was not influenced appreciably by the interaction. However, by increasing the silver halide coating weight of the inner red record emulsion layer the gamma of the outer layer can be modified because of the interlayer development effect.

When processed in a spray developing machine with violent agitation of the solution, the interlayer effect of Example IV was somewhat lessened.

Example V

A color print film of the type disclosed in Example I was exposed in two different ways so as to determine the magnitude of interlayer development effect. In one, only the bottom or yellow color-forming layer was exposed. In the other, all layers were exposed so as to form a neutral or "gray" scale after processing. The films were then processed as follows at 68° F.

(a) Developed 10 minutes in a color developer mixed as follows:

| | |
|---|---:|
| Water _____ cc__ | 750.0 |
| Diethyl p-phenylenediamine hydrochloride grams__ | 2.5 |
| Sodium sulfite anhydrous _____ do__ | 10.0 |
| Sodium carbonate, monohydrate _____ do__ | 47.0 |
| Potassium bromide _____ do__ | 2.0 |
| Water to make 1.0 liter. | | and washed three minutes in water;

(b) Fixed 10 minutes in a solution mixed as follows:

| | |
|---|---:|
| Water _____ cc__ | 600.0 |
| Sodium thiosulfate _____ grams__ | 80.0 |
| Sodium sulfite, anhydrous _____ do__ | 5.0 |
| Borax _____ do__ | 6.0 |
| Potassium alum _____ do__ | 6.7 |
| Acetic acid, 28% _____ cc__ | 14.0 |
| Water to make 1.0 liter. | | and washed 15 minutes;

(c) Bleached five minutes in a solution mixed as follows:

| | |
|---|---:|
| Potassium ferricyanide _____ grams__ | 100.0 |
| Boric acid _____ do__ | 10.0 |
| Borax _____ do__ | 5.0 |
| Water to make 1.0 liter. | | and washed three minutes;

(d) Fixed five minutes in solution mixed as follows:

| | |
|---|---:|
| Ammonium thiocyanate _____ grams__ | 100.0 |
| Borax _____ do__ | 50.0 |
| Water to make 1.0 liter. | | and washed 15 minutes in water, and dried.

After the identical processing just described the outermost emulsion layers (containing respectively magenta and cyan dye images) were removed by treating them in hot water. On measurement it was determined that the gamma of the inner or yellow layer was reduced 19% by interlayer effect of the adjacent developing magenta and cyan layers. When this experiment was repeated with only one change, viz., the color developer was made as before except for using one-third the amount of diethyl p-phenylene-diamine hydrochloride. The development time was extended to 20 minutes in order to achieve approximately the same extent of development as before. On measuring as before it was determined that the gamma of the inner or yellow layer was reduced about 40% by interlayer effect of the adjacent developing magenta and cyan layers. The cyan layer, being immediately adjacent to the yellow layer, exerted roughly two to three times as much influence on the yellow layer than did the outermost magenta layer. The above interlayer development effect procedure produces automatic masking which corrects for the blue densities of the magenta and cyan dyes of the color print film and produces a multicolor picture with more saturated yellows and brighter blues. In this example, the removal of the outer layers was performed only to permit the accurate measurement of interlayer effect and is not to be construed as a color process. Normally when practicing the invention of this example, the multilayer color print is left intact and viewed by normal projection. Superior color rendition is observed due to the interlayer development masking effect in the integral film.

This invention can also be used to process double stripping monopack films as well as single stripping films. For example, a stripping element can be employed which is composed of three emulsion layers with two intercalated stripping layers of the polyvinyl acetal type which contains a carboxylic acid or sulphonic acid group or a salt thereof, e. g., sodium o-sulfobenzaldehyde acetal of polyvinyl alcohol.

However, the present invention is not limited to the treatment of the general type of stripping films described in Jennings U. S. Patent 2,462,503 which have stripping layers composed of water-soluble acetals of vinyl alcohol polymers. To the contrary the stripping layers may be composed of other polymeric materials including the polymeric aminonitrogen-containing materials described in Marasco U. S. Patent 2,182,814 on pp. 445 and 446 of the Jour. Soc. Mot. Pict. and TV Eng., April 1950, and the polyvinylpyridine quaternary salts described in Richards U. S. Patent 2,487,829 and Umberger U. S. application Serial No. 115,943, filed September 15, 1949, now Patent No. 2,612,446.

Similarly, the invention is not limited to the particular intensifying solutions described above. Suitable additional intensifiers include mercury intensifiers, chromium intensifiers, silver intensifiers, etc. (see "Photographic Chemicals and Solutions," Crabtree & Matthews, Amer. Photo. Pub. Co., 1939, pp. 316–318).

However, these intensifiers while usually producing a substantially neutral-colored image do not produce a high degree of intensification. For this reason "toning" baths are preferred as intensifiers. The simplest and most practical of these are ferricyanide bleach baths containing either ferric ions or uranyl ions as the precipitant for the ferrocyanide ions produced by the oxidation of the silver image.

By converting the silver image to uranyl ferrocyanide, one can increase the gamma to blue light as much as ten times but substantially less to green light and still less to red light. By converting the silver image to an iron-toned blue image, one can increase the gamma to red light by ten times, to green light by four times, and still less to blue light. In cases where nearly equal gamma to all wavelengths is desired, mixtures of ferric and uranyl ions with ferricyanide are practical. Other methods of intensification such as nickel dimethyl glyoxime toning, silver iodide mordanting of basic dyes, and color coupling development can be employed.

Other oxidizing agents may be used to convert the silver image to silver ion or insoluble salt thereof. Cupric ions, dichromate ions, stannic ions, permanganate ions, etc., in the presence of chloride ion will form an image of insoluble silver chloride. Other anions than chloride which precipitate silver ions may be added to the above oxidizing baths. Other bleach baths containing chlorine, bromine, iodine, or any oxidizing agent of sufficient potential to oxidize silver images can be employed. The insoluble silver salt is then intensified by coupling development.

It will be appreciated that these intensified images, since they are not usually neutral in color, permit contrast control by appropriate selection of the spectral range of the printing light.

It is obvious that the invention is not limited to use with the particular multicolor print film described above wherein the color couplers are in the emulsion layers. It is useful with other types of films such as multicolor monopack films designed to be processed in developers containing color-formers capable of forming quinoneimine or abomethine dye images. The pre-masked negatives of this invention can be used to make relief image matrices for dye imbibition printing and they can also be used to produce prints obtained by dye mordanting and toning (organic or inorganic) processes. In fact the invention can be used advantageously with nearly all of the color printing processes now in common use including the various reversal methods (see pp. 225–227, pp. 232–234, Progress in Photography 1940–1950, Focal Press Limited, 31, Fitzroy Square, London, W. 1).

Interlayer development effects obtained by practicing the invention make dye image colors more brilliant by exaggerating density differences in emulsion layers. By appropriate layer arrangement and adjustment of coating weights and layer thicknesses, the increase in color brilliance can result in more faithful color rendition. When a low coating-weight blue record is the under layer to a high coating-weight green record, the automatic masking acts to correct for the blue light absorption of the magenta dye used to carry the green record image in the release print stock. When a low coating-weight red record is the under layer to a high coating-weight green record, the masking acts to correct for the red light absorption of the magenta dye. If both green and red record emulsion layers are of approximately equal, relatively heavy coating-weight, then interlayer effects correct for both the red density of the magenta dye and the green density of the cyan dye of the release print film.

The invention offers several advantages associated with the physical operations necessary in stripping films. For instance, it permits stripping (in the general sense of "throw-away" or emulsion-transfer processing) after developing. It makes it possible to perform the delicate emulsion-transfer operation in normal room lighting since the developed film is no longer affected by light. There is a greater freedom in the choice of transfer solutions. For example, the anionic wetting agent solution set forth in Example I above could reduce the speed of the layer as much as 30% if stripping preceded development. If stripping precedes development, "throw-away" processing is impossible, because no master positive can be made prior to stripping. Also, because no master positive can be made prior to stripping, there is no assurance against possible damage during emulsion transfer. There is also considerable freedom in hardening the emulsion prior to stripping when stripping is performed on processed film. Similarly, when processing precedes stripping, it is quite possible to use infra-red, dielectric, or induction heating as a stripping aid without endangering the image.

Intensification permits the use of low coating-weight emulsion-layers (particularly the blue record layer) with greater speed and resolution in the other emulsion layers resulting. Also the intensified layer itself may be increased in speed by choice of appropriate toner-intensifier.

Another advantage of this invention is that greater camera or "taking" speed is attainable by permitting good color analysis with greater color sensitivity overlap of the emulsion layers.

Another advantage is that it is possible to utilize just one film for exposure in a camera to either daylight or incandescent illumination. Correction for difference in color temperature of the illumination is not by the usual filter method but by using intensifiers for one or two image-bearing layers of a 3-color system which produce just the correct speed to insure balanced negatives. For example, iron toners high in ferricyanide content produce large intensification in the "toe" of the H and D curve—thus increasing the speed of the layer intensified. By similar means the speed of the intensified layer can also be diminished.

Magneta dyes can be chosen which have good transmission of red light. In this case it is conceivable that interlayer development effects exaggerated to correct for the red density of magenta dye as discussed previously might have a deleterious effect on color reproduction. However, good use can still be made of this effect when an intermediate color film is used. In color films intermediate between the camera film and the release print film, layer arrangement and spectral sensitivity can be adjusted at the will of the manufacturer (within reasonable limits) to achieve desirable results. For example, the red record separation positive which has been interlayer development masked by the green record could be printed into the yellow color forming layer of a color dupe film and the green separation positive into the magenta color forming layer of the "dupe" film. The above interlayer effect then corrects for the blue density of the magenta dye in the "dupe" film. This is a very important advantage in that it introduces the concept of "pre-masking," i. e., the process of masking negatives or positives ahead of time to correct for the known deficiencies of dyes used in intermediate multilayer color films. This correction is important because the serious color degradation resulting from copying a non-masked color reproduction employing color formers with non-ideal spectral characteristics is well-known. Our "interlayer-development-effect" premasking can be adjusted to automatically correct for the known deficiencies of any dye in the release print or in any intermediate color films. It is important to preserve high resolving power throughout all intermediate stages of color reproduction processes. For example, when using a color release print film as described in the Journal of the Society of Motion Picture and Television Engineers, November 1950, pages 455–476, it is preferable to use a color negative intermediate or duplicating film which has the yellow color-forming layer outermost and the magenta color-forming layer next to the support. In this way the all-important green color-component record is always in the outermost emulsion layer. This color-component record eventually prints the magenta colorant and therefore is the most important contributor to visual density. The cyan colorant also contributes appreciably to visual density and should also be kept in a position to favor its sharpness. When the cyan colorant has particularly heavy undesired absorption in the green spectral range, it can assume greater importance than the magenta in contributing to visual density. However, such undesirable colorants are avoided when possible.

With the color negative intermediate or duplicating film described above, exaggerated interlayer development effects correct as follows: for the green density of the yellow and cyan colorants in the "dupe" film, for the red and blue densities of the magenta colorant in the final print film, and for the blue density of the cyan colorant in the final print stock.

In the second paragraph of this specification, it is mentioned that tristimulus theory specifies negative or minus sensitivity in some spectral regions. This is well known. See Hardy and Wurzburg, Journal of the Optical Society of America, 27, 227 (1937). For example, the red color-component emulsion layer ideally should have its predominant sensitivity in the red spectral region, should have negative sensitivity in the green spectral region, and should have weak sensitivity in the blue-violet spectral region. How this can conveniently be approximated will now be described. A negative or camera film element to be exposed through the support has a blue light-sensitive emulsion layer, a red light-sensitive emulsion layer, and a green light-sensitive emulsion layer coated in that order on the support. The amount of yellow filter dye between the blue and red sensitive emulsion layers is limited in quantity so that some blue light records in the red sensitive layer. During development the interlayer effect of the outermost or green sensitive emulsion layer retards development in the middle red sensitive emulsion layer. In effect this produces negative or minus sensitivity of the red sensitive emulsion layer to green light.

As many widely different embodiments of this invention can be made without departing from the spirit and scope thereof, it is to be understood that the invention is not to be limited except as defined by the claims.

What is claimed is:

1. A process of color correction which comprises developing a multilayer photographic stripping film having on one side of the film support two latent silver image-bearing layers and a yellow filter layer as the sole colored light filtering material in the film, the outer layer having a coating weight of at least 75 mg. of silver halide and the inner layer having a coating weight of 14 to 35 mg. of silver halide per square decimeter, in an aqueous developer solution to develop the latent images to such an extent that the contrast of the silver image in the innermost image-bearing layer does not exceed $0.8\gamma_n$ where $\gamma_n$ is the gamma obtainable in said innermost layer under identical development conditions but without any exposure in the outer layer, stripping the outer image-bearing layer from the inner one, intensifying the silver image in the inner layer to gamma 0.50 to 1.00 with an inorganic aqueous toning bath, separately printing an image record from the images in the inner and outer layers into a multi-layer color film and color developing said multilayer film to form said records in the form of two subtractive colorants which are superposed in register.

2. A process as set forth in claim 1 wherein each latent silver image-bearing layer contains a non-diffusing color former capable of forming a dye image taken from the group consisting of quinoneimine and azomethine dyes.

3. A process as set forth in claim 2 wherein said developer solution contains p-diethylaminoaniline.

4. A process as set forth in claim 2 wherein said color formers are polyvinyl acetal color formers.

5. A process as set forth in claim 2 wherein said toning bath contains ferricyanide ions.

References Cited in the file of this patent

UNITED STATES PATENTS

| Number | Name | Date |
|---|---|---|
| Re. 18,680 | Troland | Dec. 6, 1932 |
| 1,993,576 | Troland | Mar. 5, 1935 |
| 2,126,137 | Potter | Aug. 9, 1938 |
| 2,182,814 | Marasco | Dec. 12, 1939 |
| 2,347,119 | Michaelis | Apr. 18, 1944 |
| 2,364,379 | Mannes et al. | Dec. 5, 1944 |